March 20, 1956  W. T. PRITCHARD  2,738,813
METHOD OF PLANING AND EDGE JOINTING LUMBER STOCK AND
A PLANING MACHINE FOR CARRYING OUT SAID METHOD
Filed Jan. 30, 1950  3 Sheets-Sheet 1

INVENTOR.
Wilmot T. Pritchard
BY
Arnold and Mattis
ATTORNEYS

INVENTOR.
Wilmot T. Pritchard
BY
ATTORNEY

United States Patent Office 2,738,813
Patented Mar. 20, 1956

2,738,813

METHOD OF PLANING AND EDGE JOINTING LUMBER STOCK AND A PLANING MACHINE FOR CARRYING OUT SAID METHOD

Wilmot T. Pritchard, Seattle, Wash.; Peoples National Bank of Washington and Inez S. Pritchard, executors of said Wilmot T. Pritchard, deceased Application January 30, 1950, Serial No. 141,244

23 Claims. (Cl. 144—36)

My invention relates to a method of planing and edge jointing lumber stock and a planing machine for carrying out said method. More particularly my invention relates to a novel method for planing lumber stock characterized by providing improved results as respects the finished edge or corner on the groove edge of lumber used as flooring, said corner being formed by the intersection of the plane of the face and the plane of the groove edge of the flooring. A primary object of my invention is to provide such improved corner to the stock.

Also, a primary object of my invention is to prevent waste. According to present practice one of the sources of waste arises by reason of the edge jointing. Another source of waste arises by reason of raised grain and breakage. Accordingly, a primary object is to provide improved results as respects preventing raised grain and minimizing the tearing of cross grain and breakage and at the same time meeting the modern requirement of high rate of feed.

The stock delivered to the planer or final finishing machine is stock which is selected and substantially the final product from the trees. In other words, the cost of logging, transportation, sawing, kiln drying, handling, and the like, have all been accumulated against this stock.

In the event that any of the stock is wasted by inefficient method or by imperfect planing operations, a great loss results due to the accumulated costs and therefore not only a waste of labor, time and money, but also a waste of one of our most valuable natural resources, namely, our forests. Such losses constitute a continuing loss accompanying each day of operation and therefore a large factor in the success or failure of a lumber producing plant. A primary object of my invention is to eliminate this loss and waste and to provide an efficient method of planing and edge jointing lumber stock—not only in preventing wastage of the stock as a whole by breakage or otherwise, but by reason of the product being degraded due to imperfect planing.

My present invention is an improvement upon the inventions set forth in United States Letters Patents No. 2,102,186, granted December 14, 1937, and No. 2,204,439, granted June 11, 1940, wherein are set forth extensively conditions obtaining respecting planing operations, and wherein the undersigned was a joint inventor. The planing machines of said previous patents operate with efficiency and turn out a product of superior quality. My present invention provides for advanced and improved results over said previous inventions arising by reason of new functional relationships provided.

Lumbering operations now process logs which previously would have been discarded. Much of the stock presently comes from second, instead of first or old, growth timber. The dry kiln operations particularly affect some second growth adversely so far as planing operations are concerned. The accelerated drying due to the dry kiln operation leaves the lumber often very much distorted and of a brash character, that is, of such brittleness that it is easily broken in passing through the machine, and this is a further reason for requiring that the forces applied to the lumber in causing it to pass through the machine must be of a relatively non-injuring character and magnitude. The present stock may have cross grain, parts of which are more subject to being lifted by the knives and give a roughened effect to the surface. It is a primary object of my invention to minimize this effect.

Particularly is it important to always keep in mind in considering planer problems that the lumber stock is a relatively compressible, fibrous material and varies greatly in its moisture content. Some plants require for their operation a low moisture content while others require a greater moisture content. The planer must be capable of meeting the various requirements arising by reason of these different requirements.

Since the material is of such compressible character it is subject to being injured by reason of too high a feeding pressure in attempting to secure a high rate of feed. The stock or blanks to be processed by the planer are of rough sawn surface variable in width and thickness and often twisted and distorted in shape.

A piece of lumber stock is produced from a growth of a highly individualized character. Its character is influenced by difference in rainfall of the seasons. Also whether the particular tree is exposed to strong winds and also its character depends upon the degree of sunshine to which it may be exposed as well as the character of the soil in which it is grown, and whether it grew on level or sloping ground so as to cause the tree to lean and thereby produce stresses in the wood. Nevertheless, the product in a piece of flooring, for example, must be as nearly uniform in final production results as possible as the stock from a highly favored tree may be laid next to a piece from a tree which has grown in an unfavorable environment. It is the object of my invention to provide for this uniformity of finished product to the fullest extent possible.

The knives of the planing cutter heads operate to press down the hard portions of the grain into the softer portions which creates the basis for raised grain objection. It is to be particularly noted that in my invention these knives in a 16 knife cutter head operate at 3450 R. P. M. (full load speed) (3600 R. P. M. synchronous speed of a two pole motor, 60 cycle current) with a lineal rate of feed of the stock varying from 500 to 700 feet per minute, strike a series of hammer-like blows while cutting the stock totalling 55,200 per minute. Thus the compressor action of the knives is manifest. Furthermore, to meet the requirements of high rate of feed, the stock must be fed through the planer with considerable feeding pressure. Accordingly, we have on the one hand a highly compressible fibrous mass composed of rings of growth which alternate relatively hard and soft, and on the other hand we have the need for feeding pressures of a magnitude which will cause the lumber to go through the machine at a relatively high rate of feed for economical production. These and other opposing and conflicting requirements are successfully overcome by my invention.

My invention provides in its preferred form for a free flowing channel (the opposite of a closely confining or holding or choked channel) in which the stock has plenty of room to be flexed normally of its face, and thereby great friction strains opposing the feeding are eliminated. Also, as to the width of the passageway it likewise permits free passing of the lumber, even a piece which longitudinally is what is known as snaky or curved stock. The drying operation as well as the manner in which the log is sawed may release strains in the lumber which causes it to become longer on one side than on the other, and therefore be curved or bent longitudinally of its axis.

Nevertheless, while providing for free flowing of the stock and running true to the edge guide, provision must be made for elimination of vibrations in the stock which are developed by the high speed cutter head operations and by reason of the stock traveling at high rate of feed. These must be dampened or annihilated to a point that they do not provide an uneven, wavy, finish on the lumber. The lumber which has a wavy surface when laid in a floor will quickly reveal the unevenness due to the reflection of light which affords a most delicate detective means. Therefore, the surface of the lumber must lie substantially in one plane.

Thus, it is obvious that if the feeding pressures are such as to compress the hard portions of the grains into the soft portions while going through the machine, later on this grain will gradually spring back to its normal state and thereby provide a raised grain surface. This raised grain objection is aggravated greatly by the action of the knives in their compressing the hard portions of the grain into the soft portions. Accordingly, particular care must be taken that the stock when it reaches the knives has not been subjected to a high feeding pressure, because if the knives are thus to operate upon such a compressed surface of stock, the pressure of the knives will further augment the raised grain difficulties. Therefore, it is my purpose to provide a method of planing and a machine therefor which will not require objectionable high pressure feeding and will eliminate the vibrations and permit the lumber to flow freely and truly through the machine.

My invention is particularly characterized by providing a channel permitting free flowing of the stock combined with the positioning of the cutter heads—one with respect to another. Especially is this true of the location of the first edge or jointer cutter head. However, as will appear more fully hereinafter the advantages of my invention as respects the locating of the pre-jointer after the feed mechanism of the planer and on the edge of the stock which is to receive the groove may be gained in part even on the orthodox planers which do not have said channel permitting flexing of the stock and which have a standard arrangement of the cutter heads.

For many decades it has been the accepted fundamental rule in planing and matching lumber that the edge of the stock having the groove should run against the edge guide of the machine, and the matcher groove cutter head should remove a predetermined set amount of stock or cut. The matching head providing the tongue on the other hand performed the function of removing all excess of the width of the blank of stock to reduce it to the width of the particular product or size being run. The groove cutter head was set to take a fixed cut of sufficient thickness to remove saw marks and provide an even corner formed by the plane of the finished face of the lumber and the plane of the edge of the lumber. There was ordinarily in common practice no prejointing of the groove edge and as a result much wastage of the stock occurred by reason of the setting of the edge jointer to take a fixed cut by which it was attempted to insure a removal of excessively deep saw marks. This fixed cut thus removed stock of a thickness to insure, to a degree as great as possible, removal of high points and deep cuts even when the stock did not so require. Even then skipped portions required rehandling of the lumber in sorting to have sections trimmed out, thus causing the length of a blank to be reduced to pieces of shorter length.

In the United States Patent No. 2,204,439 granted June 11, 1940, provision was made for pre-jointing stock on the groove edge. However, in the construction therein difficulty developed in getting the stock to run continuously against the edge guide. Looking down upon the guide edge prejointer cutter head of that invention, it can be observed that the stock passing at a high rate of speed, such as 500 to 700 lineal feet per minute, results in the stock being bounced away from the jointer knives as the high points of the stock are engaged by the cutter head. As a result, there is a continual fluttering of the stock away from the cutter head so that the jointing of the edge is not continuous. In that invention, despite the attempt to make the stock in its travel abut against the piece of stock preceding, the stock did not invariably so abut. The length of the blanks vary and they vary also as to weight. Accordingly, there was a greater and lesser inertia in the different pieces, and it was not always possible to start the stock promptly so as to make it engage the piece ahead even though there was accelerated feed roll operation. In the present invention, the stock positively requires the piece following to be abutting to push the preceding stock forward and therefore it stops and waits if there is any separation until the following piece abuts against the same. We thereby have an interlocking of the rough ends of the blanks and this tends to make a continuous ribbon, as it were, of the stock and makes it run more evenly and truly against the edge guide.

A great deal of money has been spent in experimentation and study trying to overcome this difficulty. The present invention has been successful in meeting the problem. It provides for the stock to be fed continuously against the edge jointer, or what may be called, a guide edge prejointer—the jointer functioning to smooth the groove edge and provide a continuous smoothed face by removing the saw marks and high points to be run against the edge guide so that the matcher providing the groove may be set to take a relatively thin continuous cut. This is possible because the stock can be caused to run truly against the edge guide due to the saw marks having been removed by the guide edge prejointer and a smoothed edge provided to the stock for guiding purposes. This results in saving much waste because the constant fixed set cut of the matcher groove providing head can be reduced to a relatively thin cut. All this insures a continuous even corner formed by the intersection of the plane of the finished face with the plane of the groove edge, as will be shown hereinafter. Unless this corner is provided of a continuous straight line character, there would be an opening between the assembled pieces of flooring. This requires a trimming out of all such portions having a defective corner of the timber and thereby results in a wastage not only of stock but of time and labor.

The matcher head providing the tongue in common practice is employed as the means functioning to cut off the excess stock back to the width required of the particular stock being run, using the corner of the groove edge as the base. This is done because if a piece of stock is too narrow to permit of the full-sized tongue it does not matter if the tongue is shortened and does not extend laterally its full normal distance because the abbreviated tongue would be located within the groove and would not be noticeable. Thus, the tongue edge of the stock is used as the edge to absorb the variations in width of the product produced. This explanation makes clear and emphasizes the fundamental importance of providing a corner formed by the plane of the finshed face and the plane of the groove edge to be positively, uniformly, continuous and of a square character in order to provide no opening between the assembled pieces of stock.

My invention provides this continuous corner and avoids wastage of the stock arising by reason of the present failure to provide such corner as above set forth.

Briefly and therefore incompletely stated one of the features of my invention is the discovery that by placing the pre-jointer after the planer feeder mechanism of the planer, and preferably after a first face planer cutter head, that the above referred to corner on the face of the lumber on the groove edge may be insured and that the arrangement of the cutter heads operate to overcome vibrations and the requirements of a heavy feed pressure are kept down so that undue feed compression strains are avoided, which result in raised grain. Also, it is a primary object of my invention to cause the stock to run consistently, continuously true to the edge guide with minimum of friction as respects the edge guide.

In planing operations one of the great problems has been to cause the stock to run unfailingly true and continuously held against the edge guide. Once the stock is fed to the guide, thereafter the hold over means may operate in keeping it there but the stock tends to run away from the guide. If the stock has not been fed by the feeding mechanism against the guide, it is very difficult thereafter to get the stock to the guide. It would require the hold over means bending the stock and that is very difficult if not impossible. If it is attempted to apply great force in the hold over means or in the feed mechanism to make the stock run against the guide, then a difficulty arises in the development of great heat by the stock running against the guide. This heat becomes so great that often it sets the wood on fire and often causes a warping of the guide. Furthermore, to overcome this, water cooled guides have been constructed and employed. Often water is poured upon the guides to keep them cool as well as upon the stock to keep it from catching fire.

When it is remembered that the rough sawn stock with its projecting fibers and ridges catches and holds much grit in the form of sand and cinders while being stored and dried, it becomes in fact relatively heavily loaded with grit. The edge of the stock thus becomes a veritable abrasion means against the edge guides. Thus, these guides have to be very frequently renewed. A primary object of my invention is to overcome this difficulty. I have discovered that by using the planer feed mechanism, the feeding of the stock can be focused upon the area of the edge guide just in front of a guide edge prejointer located on the far side of the machine. The feeding mechanism in this position with respect to the guide edge prejointer operates also not only to make the stock run to the edge guide, but also operates to hold the stock against the guide edge prejointer while a smoothing and removing of the high points on the edge of the stock is carried out. By so locating the guide edge prejointer with respect to the stock on the edge of the stock on which the groove will subsequently be formed, it provides for maintaining the stock against the guide edge prejointer very consistently. By thus pre-edge jointing the stock a smooth guiding edge is provided to the stock as well as the removal of the highly gritty and rough edge of the stock. The guide edge prejointer is set to provide a smooth cutting action to the stock, that is, it removes for the most part the heavy saw marks as well as the high points of the stock.

It is to be remembered that the stock is being run in my invention at the rate of 500 to 700 lineal feet per minute and consequently the guiding of the stock to the guide and holding it there is of fundamental importance. The high points contribute to the bouncing away from the jointer at such speeds. Thus by locating the guide edge prejointer on the groove edge of the stock adjacent the feed mechanism, the vibrations set up at this point are remote from the matcher heads at the outfeed end of the machine and full advantage is taken of this spaced relationship to allow the stock to pass to the groove matcher head while the stock is free from the very heavy vibrations originating in the front or feed part of the machine. This permits the fixed cut made by the groove producing matcher head at the opposite end of the machine to be set for a relatively thin cut. Thus, this cut so made provides for a very clean cut corner by reason of the fact that the knives do not have to engage a grit loaded face.

Since the stock has thus been given a smooth clean guiding edge by the guide edge prejointer located adjacent the feeding mechanism, it results that the stock will run consistently more truly against the guide throughout the rest of its course through the machine. Great advantage is attained in locating the guide edge prejointer anywhere between the groove matching head on the outfeed end and the feeding mechanism, but, of course, in such an arrangement the further the guide edge prejointer is removed from the feeding mechanism, the less advantage is taken of the feeding mechanism in holding the stock against the guide edge prejointer. The maximum advantage is thus secured by placing the guide edge prejointer cutter head next to the feeding mechanism or in that area of the edge guide upon which the feeding mechanism focuses the feeding of the stock. In the above, it is to be noted that the guide edge prejointer is located on the side of the machine on which the edge guide is located with pressure means on the opposite side so that the stock is pressed against the said prejointer. Even though said guide edge prejointer is placed near the matcher head which provides the groove, nevertheless the advantage of the feeder mechanism is taken by reason of the fact that the smooth edge with the removal of the high points permits the stock to run more truly and with less friction against the guide entirely throughout the machine.

The first top planer head is advantageously positioned in the preferred form of my invention immediately directly before the guide edge prejointer cutter head, that is, immediately after the feeding mechanism. At this point the stock may not yet have reached the edge guide and yet the face planer may operate while the stock is en route to the edge guide. This is the preferred location of the guide edge prejointer as respects the first face planing cutter head because for one reason the guide edge prejointer then works upon a greatly reduced thickness of the stock. In fact, some twenty-five percent less power is required to operate the guide edge prejointer when so located. Nevertheless, if preferred, the face planer head may be located after the guide edge prejointer and the advantage of my invention may be obtained even though in a somewhat lesser degree.

Furthermore, the advantages of my invention may be in part obtained by the omission of the face cutter head altogether and the stock operated upon only by the prejointer head on the groove edge of the stock. In this case, the feeding mechanism should be reversed and the fixed feed rolls comprising the upper feed unit placed above the stock and the resilient bed portion of the feed mechanism run on the bottom side of the stock so as to feed the stock upwardly rather than downwardly which is the method of feed when the face planing cutter head is employed in conjunction with the guide edge prejointer cutter head. Such arrangement permits the varying thickness of the stock to be accommodated by the depression of the bottom feed means. In the latter case it will be noted that the guide edge prejointer may operate upon the edge of the stock while the same is being flexed upwardly against the fixed plate above the first back or bottom cutter head.

By inclining the feed mechanism to direct or focus the stock against the guide in the area occupied by the guide edge prejointer, my invention provides for using the maximum pressure against the edge guide at the time of the guide edge prejointing when the face top cylinder is likewise employed at the time of planing the top face side. Thus the stock is provided with a clean edge, whereby I have discovered it runs truly and with far less friction due to the fact that high points, the roughness, the grit and the dirt are removed. This also reduces the feed pressure—a very important advantage or new functional relationship as it reduces the raised grain problem. The holding of the stock against the edge guide employs the rigid character of the edgewise strength of the stock and permits the use of this strength in holding the stock unfailingly and quite continuously against the edge guide and therefore against the guide edge prejointer located at the general area of focusing of the feed against the edge guide and jointer. All this contributes to providing positively for the improved corner formed by the intersection of the plane of the finished face and the plane of the edge.

Another requirement of lumber processing machinery is that it must occupy as little floor space as possible, and therefore it is my purpose to keep the length of my machine to a minimum. Floor space in a plant is often a most important consideration.

For purposes of definiteness and clearness of description and illustration, my invention will be set forth as the same applies to the conditions and problems of converting rough sawn blanks or stock into tongue and groove flooring, but it will be definitely understood that the invention is not to be limited to the manufacture of any specific product but is applicable to all products where like conditions obtain in whole or in part or are substantially present. Moreover, in employing flooring as an example of the product of my method and mechanism, be it noted that a most exacting product is selected because flooring when laid to form a floor is subject to the reflection of light and any unevenness or any inaccuracy of operation is quickly revealed, especially as respects the finished corner of the stock of the groove edge on the face side of the board as it will leave a plainly noticeable crack or opening between the assembled pieces of laid flooring. Thus, it is manifest that we have conflicting requirements with several features of dealing with lumber stock available for processing. My invention has met these requirements in actual commercial production so that its operativeness has been definitely and positively established.

The above-mentioned general objects of my invention, together with others inherent in the same, are attained by the mechanism illustrated in the following drawings, throughout which drawings like reference numerals indicate like parts.

Figure 1:
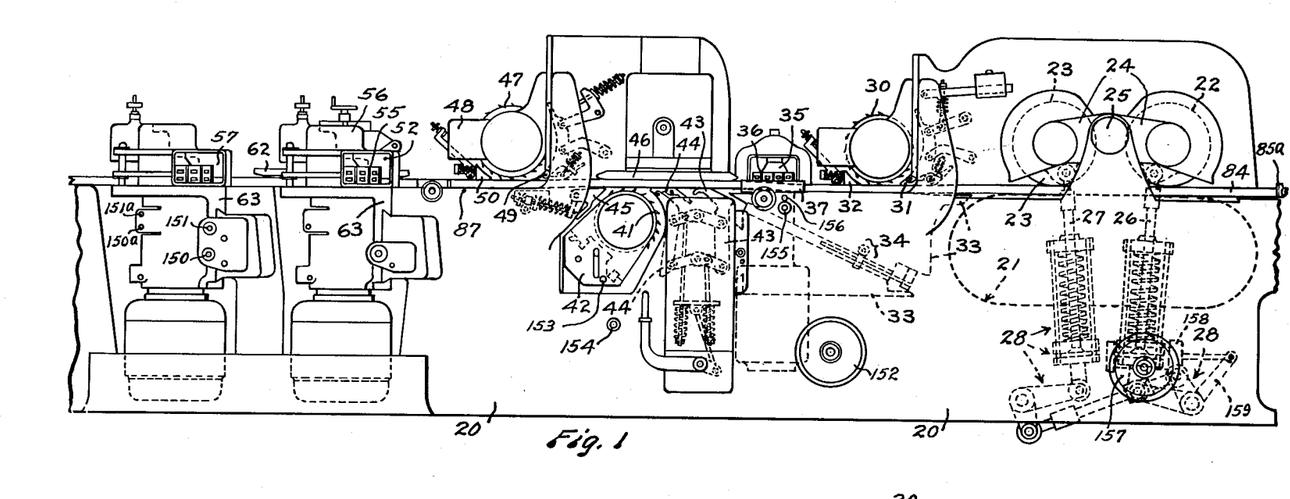
Figure 1 is a longitudinal view in side elevation of a machine embodying my invention.

In describing my invention, at times it may be convenient to speak of upwardly and downwardly as this is the language commonly employed about the mill. The preferred position of the planer of my invention is one in which the machine is illustrated in Fig. 1 wherein the final face finishing cutter head operates last with the stock face up. The operator can thus conveniently observe the performance of the machine as the finishing face is "upwardly" disposed. This will explain why, as one example, the "flexing" of the stock is readily referred to as being flexed "upwardly" or "downwardly." It will be understood that this horizontal positioning of the machine is only a preferred form.

A planer frame 20 formed of a single casting so as to provide a unitary structure from one end to the other of the machine may have a caterpillar feed 21 as the fixed bottom feed unit or means of the infeed mechanism, and disposed thereabove are two roller feed means 22 and 23 of the upper unit resiliently mounted on a bracket 24 which is pivotally mounted at 25. The longitudinal axis of the infeed mechanism is disposed at an angle inclined to the axis of the machine, thus providing what is known in the trade as " lead in the feed mechanism relative to the guide," so that the stock is initially fed at an angle to the edge guide 29, which also is inclined towards the longitudinal axis of the planer. Preferably, this inclination of the edge guide, although of small angle, extends throughout the length of the machine, that is, inclined transversely, i. e. diagonally of said frame from the infeed end to the out-feed end of said frame towards the near side in direction of feed. Guides 61 and 69 may be considered a continuation of edge guide 29, interrupted by cutter heads 35 and 58. Thus, the stock may be caused to bear continuously against the edge guide and the pressure of the press bars may be lessened. The roller bracket 24 is pivotally mounted on links 26 and 27 provided with spring and link means 28 which operate to move simultaneously the rollers 22 and 23 to and from the face side of the stock, the details of which will not be described as they are not a part of this invention and are of known design.

Next, immediately after, i. e., proceeding in the direction of the feeding of the stock, the feed mechanism is mounted a first face planing cutter head 30 which is designed to provide a smooth top surface to the lumber stock by removing the rough saw cut marks with enmeshed grit and any surplus material which may be formed on the stock in excess of a predetermined thickness. By "face" is meant the surface of the finished product presented or exposed to use as opposed to the "back" which may be hidden from view. This cut will vary from zero to a half-an-inch or even more in some instances. By thus removing such excess including the saw marks, a firm, hard uniform surface is provided to the stock for guiding purposes during subsequent operations, and which facilitates greatly the flexing and passing or free flowing of the stock without creating highly objectionable frictional forces, and also provides for true running of the stock and accurate thicknessing measurement of the lumber by subsequent thicknessing planer cutter heads. This first face planing cutter head 30 also performs a thicknessing operation without end snipping of the stock due to the fact that it has two resiliently mounted pressure bars or presser means 31 and 32. Advantages of this head in part are obtained if only the pressure bar in advance of the head is employed. The pressure bar following prevents end snipping of the stock. Opposite this first face planing cutter head 30 is disposed a platen base 33 which is adjustable vertically or at right angles to the face of the stock by screw and worm means 34. This platen is adjustable to provide desired initial flow line with respect to the feed mechanism and provide for wear. By "thicknessing operation" is meant that the cutter 30 is set a predetermined distance from or above platen base 33 and then as the stock passes downwardly with a pressure by pressure means 31 and 32 sufficient to hold the stock against the platen base, a board of predetermined thickness is provided equal to the distance of the cutter above the platen base by reason of the metered cut taken by cutter 30 of all stock above the predetermined distance of the cutter above the platen. That is, the flowing stock is subjected to a downwardly metering pressure. The cut as stated above varies from zero to half an inch or more. Thus the stock may be set to be subjected to a "stock metering pressure" because it is pressed against the platen 33 and only a cut is taken out of the stock which extends above said predetermined distance. By "stock metering pressure" is meant that the flowing stock is pressured downwardly as respects the cutter against the platen base 33 so that the thickness of the cut taken by cutter 30 will be measured or metered by the amount extending above the predetermined spacing of the cutter 30 above the platen base 33.

Next, i. e., directly after said first face planer cutter head, is located an guide edge prejointer 35 on the frame 20, functioning in my invention as a guide edge prejointer, with knives 36 to impart a smooth edge surface to the stock by removing saw tooth marks and so forth and any unevenness in the material. This permits ready flexing of the stock up and down in the channel way as it bears against the edge guides 61 and 69 and provides a firm surface as a guide for the stock in determining subsequent measurement as to width.

The direction of feed of the feed mechanism 21 is against the area occupied by this guide edge prejointer 35. Thus, although the maximum pressure of the feed mechanism is applied to the stock in directing it to the guide 29, which would normally create a heavy friction and thereby great heat which would be highly objectionable, nevertheless, by reason of its being directed against the guide edge prejointer primarily the pressure against the guide edge prejointer is lessened by reason of the receipt of such pressure in large measure by the guide edge prejointer 35. This operates to remove the rough gritty edge of the stock which creates heavy friction, and the guide edge prejointer 35 also cuts away the high points so that the stock is free to run against the following guide 61. Thus, it is herein emphasized that great difficulty is experienced in getting the stock to run against the guide, and if it is not done at the feeding operation, then it is difficult thereafter to get the stock against the guide. But the trouble in getting it against the guide is that the danger arises of too great pressure against the guide, and with its inclined edge bearing as it does heavy gritty and coarse saw marks, great friction is developed, the edge constituting an abrasion means, as it were, and the stock due to the high pressure and friction is in danger of catching on fire as explained herein. By having the pressure relieved, even in part, this danger is overcome, but by having this feed pressure against the edge guide received at least in part by the guide edge prejointer, the stock is held away somewhat from the guide and it is cut to clear the following guide against which it runs with a clean and non-abrasive face. The guide edge prejointer head 35 is adjustably mounted so that it may take a fixed cut varying with the requirements imposed by the particular stock being run to insure removing the high points and the rough saw marks, the guides being also adjustable.

Opposite to guide edge prejointer 35 is preferably provided a hold over shoe 37 resiliently held by spring 38 on rod 39 on which is mounted adjusting wheel 40.

In the frame 20 of the device is preferably mounted directly after said pre-jointer 35, a back planer cutter head 41 which operates to plane the back of the stock if the stock is of sufficient thickness to permit taking a cut. This back planer cutter head 41 is mounted in a bracket 42 which provides for adjustments transversely of the axis of the table as well as vertically. Said head 41 preferably has pressure bars 43, 44 and 45, all resiliently mounted, which press the stock against the oppositely disposed fixed adjustable plate 46 which serves the function of an upper bed plate thereby providing for the taking of a measured cut by cutter head 41. This head 41 likewise provides for thickness measuring of the stock, and if the particular stock is too thin to provide for removing a cut, then the cut is not taken so that the particular piece of stock is not destroyed for the particular dimensioned stock being run, but whatever planing is to be done is left for the finishing cutter for the top face of the lumber. Be it remembered, this sorting, as it were, is done while the stock is running through the machine at 500 to 700 lineal feet per minute.

The next device mounted in the frame 20 preferably immediately after said back planer cutter head 41 is the finish face planing cutter head 47 adjustably mounted in bracket 48. This finishing cutter head 47 preferably has resiliently mounted pressure bars 49 and 50. Hold over shoe 51 which may be of identical construction to 37 may be located immediately following cylinder 47. Be it noted, of course, a hold over roller, as 85a of standard design may be employed as the partial equivalent of said shoe. Both are commonly used but I prefer the shoe as the hold over type of means because one end of said shoe may be caused to bear against the stock even during the change of widths of the stock.

Relative the presser bars: These are preferably located before and after each "face" and "back" planing cutter head to provide thickness measuring and are essential to avoid "end" snipping and thereby wasting of the stock. If these features are to be sacrificed then a single presser bar may be employed in advance of the cutter head. End snipping is one of the most serious causes of waste. For example, if stock of twelve foot length is being run and a snipping of only an inch length occurs, this will require a trimming off of two feet, i. e., to ten foot length, as it is general standard practice to produce and market lumber of a length of even number of feet.

Next in the frame 20, i. e., directly after the finish face planing cutter head, may be provided an edge jointer 52, functioning as a prehogger, on the near side of the machine which removes all surplus width of the stock to a predetermined width leaving but a small cut to be made thereafter in order to bring the stock to an accurate, predetermined width. The prehogger 52 has resiliently mounted pressure bar 53 and adjustably mounted fixed edge guide 54. This prehogger 52 has knives 55 extending across its face and providing a smooth, substantially vertical edge. This prehogger 52 is adjustably mounted on bracket 56.

Next, i. e., immediately after the said edge jointer or prehogger 52 is mounted in the unitary cast frame 20 is the pair of matcher heads 57 and 58 (see Fig. 2), that is, tonguer and groover heads, respectively, when the stock being run is to be converted into flooring. Matcher head 57 is provided with resiliently mounted pressure bar 59 and adjustably mounted fixed edge guide 60 (see Fig. 2). The edge guide 61 extends from the guide edge prejointer 35 to the matcher head 58.

Opposite to edge jointer 52 is disposed a top plate 62 which is disposed adjacent the guide 61 and about one-eighth of an inch above the channel for the stock and serves as a safety means to prevent the stock from springing up to an undue extent or away from the planer as occasionally may happen when the stock has a bend or is otherwise distorted. Such top plate 62 does not normally bear upon the stock. The matcher heads 57 and 58 are adjustably mounted in bracket 63 of common practice design.

Figures 3, 4, 5, 6, 7:
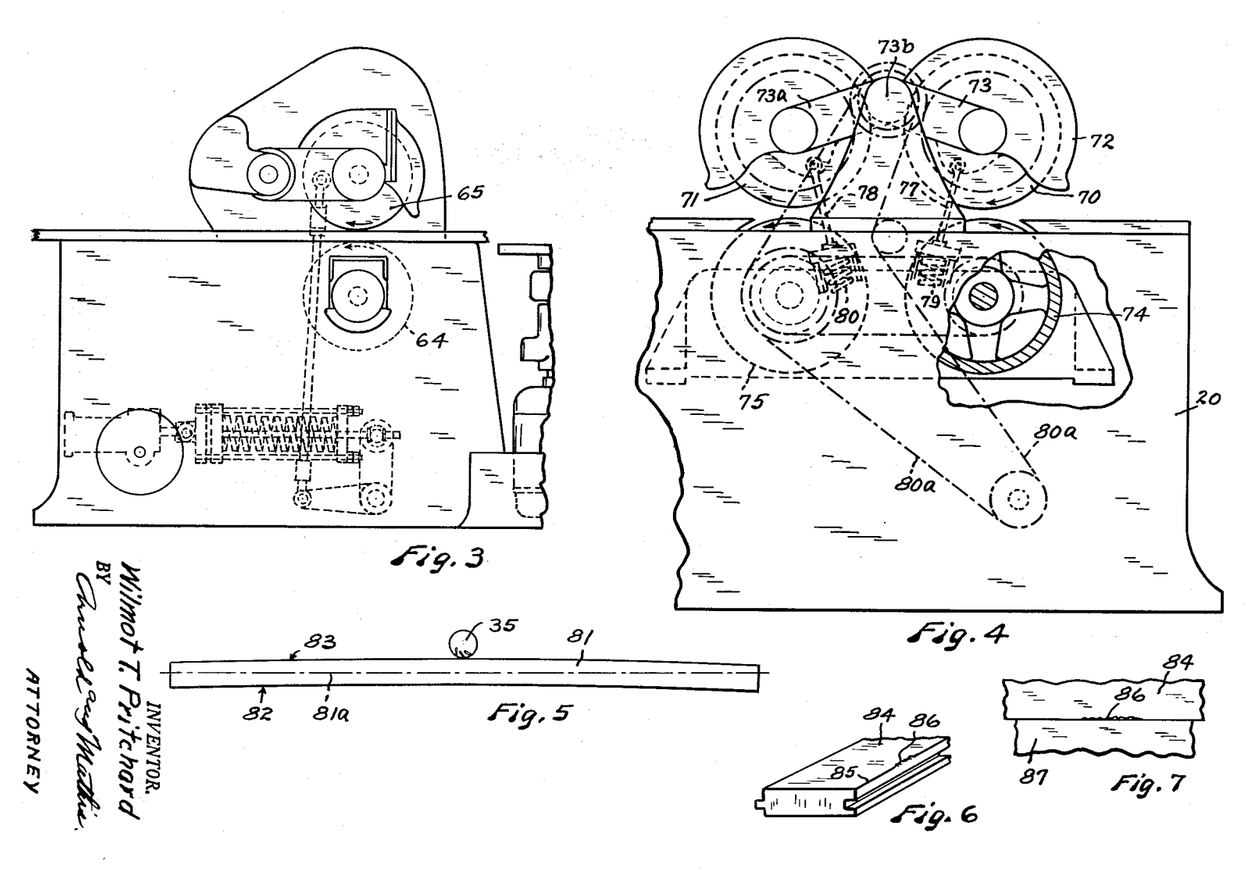
Fig. 3 is a view in elevation of the outfeed rollers.
Fig. 4 is a view of the modified form of the infeed mechanism in which feed rolls are employed in place of the caterpillar means in the feed mechanism and illustrates orthodox feed mechanism.
Fig. 5 is a diagrammatic view of a board which is curved as to its longitudinal axis illustrating the problem of guide edge prejointing such a piece.
Fig. 6 is a view in perspective of a piece of flooring showing the corner on the groove edge formed by the intersection of the plane of the finished face and the plane of the edge of the stock.
Fig. 7 is a plan view of two pieces of flooring showing the opening when the corner on the groove side or edge is not properly finished.

Edge guide 69 extends from matcher head 58 past the out feed rollers 64 and 65 to the end of the machine. Out feed rollers 64 and 65 and mountings are shown in Fig. 3 and are standard known design. Ordinarily such out feed roller mechanism is employed primarily to run out the last piece or blank of stock. The feed mechanism at the front end of the machine is ordinarily the means for pushing the stock through the machine.

The modified form feed mechanism shown in Fig. 4 illustrates a roller construction for both upper and lower units instead of a combined roller and caterpillar feed mechanism as shown in Fig. 1. On frame 20 two rollers 70 and 71 of the upper unit are mounted in bracket 72—each on its hinge mounted arm 73 and 73a pivoting on shaft 73b. Oppositely disposed to said adjustable resiliently mounted upper rollers 70 and 71, which are resiliently supported by telescoping links 77 and 78 carrying springs 79 and 80 of known design, are disposed two adjustably fixedly mounted rollers 74 and 75 in frame 20. Driving chain 80a is provided as main driving means—all of which being of known design and forming no part of this invention and therefore not described in detail.

Fig. 5 is a diagrammatic view of a stock blank 81 illustrating an occasional distorted type of stock for which provision must be made. Sawing the stock releases strains or the dry kiln heat causes some of the stock to bend longitudinally of its axis 81a and provides a concave edge 82 and a convex edge 83. A blank of this bent character in my invention may be pressed against the guide edge prejointed by the feed mechanism substantially throughout its length when the convex edge 83 is pressed against preguide edge prejointer 35.

An operator at the feed mechanism turns most of the occasional stock of this bent character so as to present the convex edge against the said guide edge prejointer 35 of my construction. When this is not done and the concave edge of such bent stock is presented to the guide edge prejointed, then there is removed only end portions of the stock, but such running of the stock is the exception rather than the rule.

In Fig. 6 a portion of flooring product 84 is illustrated in perspective for the purpose of showing the corner 85 on the groove side of the flooring piece 84 formed by the intersection of the plane of the finished face and the plane of the edge of said stock. Also, there is illustrated a defect 86 in the forming of this corner 85, the defect arising by reason of the fixed cut set for the grooving matching head of the ordinary planer not being thick enough to provide for removing the deep saw marks or other injury on this edge of the stock, and as a result the defect 86 appears.

In Fig. 7 the significance of such defect is clearly revealed when the flooring piece 84 is assembled with flooring piece 87. The failure for these two pieces of flooring to properly match results in the crack occurring in the assembled pieces at the defective portion 86. As heretofore set forth, it is a primary object of my invention to avoid such defect 86 in the corner 85, and at the same time do so in a manner which will avoid the wasting of stock.

In the ordinary planer, the fixed cut is of such a depth that it makes its cut constantly irrespective of whether the stock has a substantially straight edge and is running substantially against the edge guide 61. When it is remembered that this ordinary relatively fixed cut is of such depth to insure as far as possible the removal of the ordinary deep saw marks, it is manifest that much of the stock is wasted. When running at the rate of 500 to 700 lineal feet per minute, it is evident that this wastage can become of considerable magnitude. My invention provides for removing the high points and the rough marks by the pre-jointer 35 so that the stock will run more truly and may be holding more consistently against the edge guide 61 and thereby render it possible to set the matcher head forming the groove 58 to remove a much thinner fixed cut than is done according to present day practice.

Figure 8:
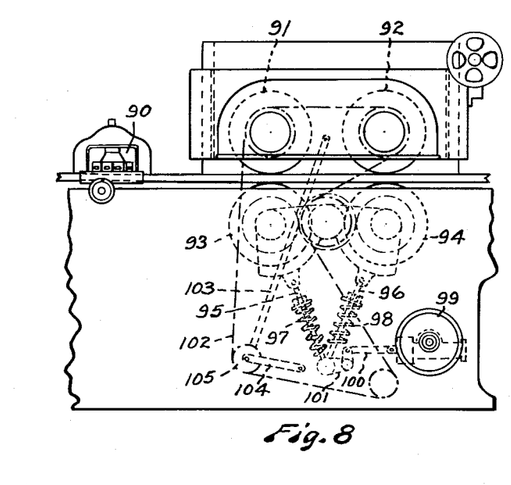
Fig. 8 is a view of a modified form of my invention in which the guide edge prejointer is located immediately after the feed mechanism without any first top face planing cutter head and with the feed mechanism having the lower unit flexibly mounted as respects the stock and the top unit or portion of the feed mechanism adjustably fixedly mounted.
Figure 9:
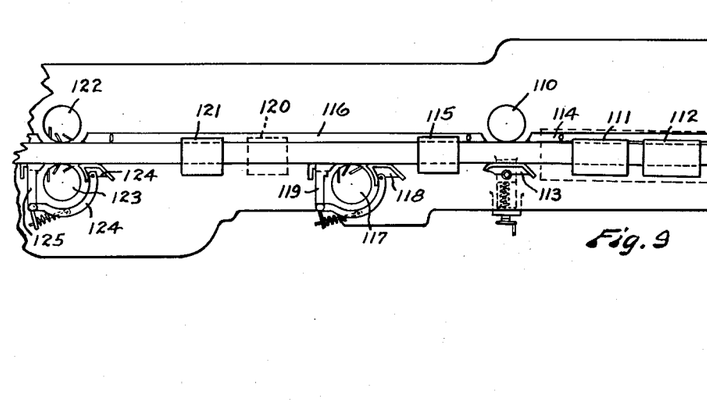
Fig. 9 is a view of another modified form of my invention wherein the edge or pre-jointer is located on the far edge of the stock or side of the machine immediately following the feed mechanism and thus followed by a top planer planing cutter head and after the latter a pre-hogging or jointing cutter head on the near edge of the stock.

In the modified form of my invention shown in Fig. 8, the guide edge prejointer 90, corresponding to guide edge prejointer or stock edge smoothing cutter head 35 in Fig. 9, is employed without a first face planing cutter head, such as 30 in Fig. 1. Such guide edge prejointer 90 is placed in that area of the edge guide where it may receive directly the stock from the feeding mechanism which comprises two upper adjustably fixed mounting rollers 91 and 92 forming the upper unit of the feeding mechanism and the lower feeding rollers 93 and 94 resiliently mounted on links 95 and 96 having spring 97 and spring 98. Rollers 93 and 94 thus form the lower unit of the feeding mechanism and are resiliently depressibly mounted in order to accommodate varying thickness of the stock and thus are just the opposite to the construction shown in Fig. 1 where the resiliently mounted rollers form the upper unit. This change is important in providing for running of the lumber upwardly after leaving the guide edge prejointer 90 against the plate 46 where flexing of the stock is involved. Where the orthodox arrangement of face and back planer heads is used (i. e. where no flexing of the stock is involved), then a feed mechanism of the character shown in Fig. 4 is employed where the guide edge prejointer of my invention is used without the first face planing cutter head 30 of Fig. 1. Motor 99 is operatively disposed with link 100 connected to bell crank 101 to adjust rollers 93 and 94. Driving chain 102 operates to drive the various rollers. Links 103 and 104 with shieve 105 function as a driving chain tightener means as the lower unit is caused to move downwardly and upwardly to accommodate the varying thickness of stock. This construction of feed mechanism is well-known and therefore it is not described in detail. The stock after passing guide edge prejointer 90 may continue through the rest of the machine as set forth for the stock after passing guide edge prejointer 35 in Fig. 1.

The modified form of my invention schematically illustrated in Fig. 9 represents a different arrangement or locating of the guide edge prejointer on the far side of the machine or the groove edge of the stock and the first face planing cutter head and the pre-edge jointer i. e., hogger, on the near side of the machine or edge of stock. In this modified form the guide edge prejointer 110 is located directly after the feed mechanism having top rollers 111 and 112 which may correspond to the rollers 22 and 23 of the feed means shown in Fig. 1, including construction and operation. Opposite guide edge prejointer cutter head 110 is preferably placed a resiliently mounted push over shoe means 113 corresponding in construction to hold over shoe means 37 in Fig. 2. An edge guide 114 is inclined to the axis of the machine corresponding to the edge guide 29 of the form of the invention shown in Fig. 1.

Immediately after guide edge prejointer cutter head 110 is located the first face planing cutter head 115 corresponding to cutter head 30 of Fig. 1 with its pressure bars and functions as does said cutter head 30 imparting a thicknessing measurement to the stock and providing a smooth guiding face so that the rough saw marks, high points and the enmeshed dirt and cinder grit particles are removed. After guide edge prejointer cutter head 110 is located guide 116 corresponding to guide 61 of the construction shown in Figs. 1 and 2. After first face planing cutter head 115 is directly located in this form of my invention, edge jointer prehogger cutter head 117 of like construction to pre-jointer 52 with its resiliently mounted pressure bar 118 and shoe guide 119. This prehogger functions similarly to prehogger mechanism 52 of Fig. 1 taking off all excess as to width of the stock over a predetermined width so that there remains only a thin cut to be made on the near edge of the stock by the matcher head providing the groove when the stock is to be converted into flooring. The stock then passes to back face planing cutter head 120 and finish face planing cutter head 121 which are of similar construction to corresponding cutter heads 41 and 47, respectively, including pressure bars. The stock then passes to oppositely disposed matching cutter heads 122 and 123 which provide the groove and tongue respectively to the stock when the same is to be converted into flooring. Matcher head 123 has a resiliently mounted pressure bar 124 and shoe guide 125.

Figure 2:
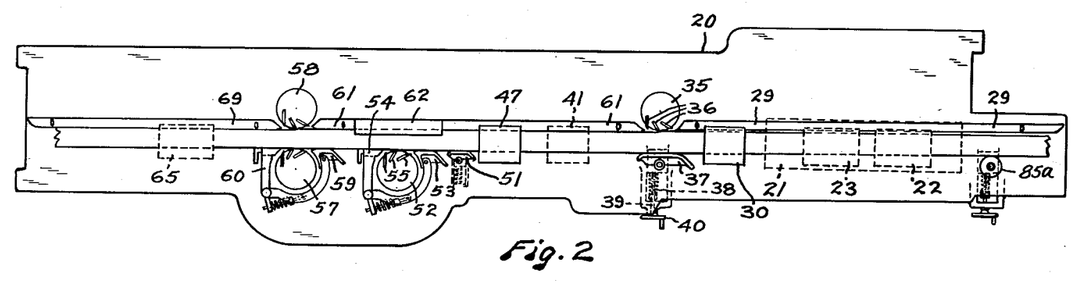
Fig. 2 is a plan view of the same.
Figure 10:
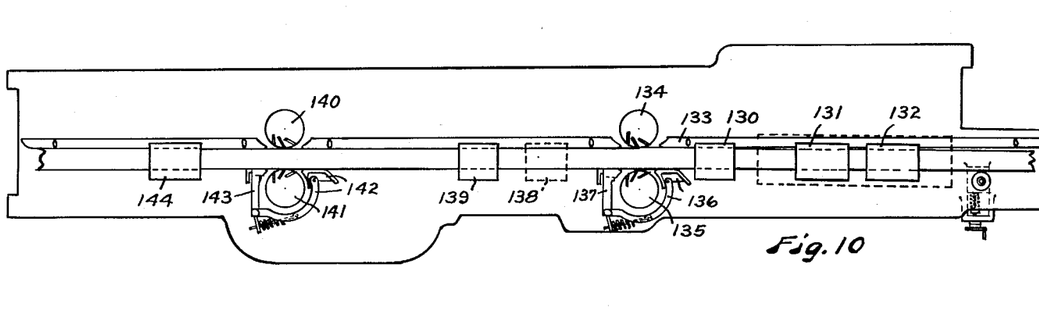
Fig. 10 is still another modified form of my invention wherein a first face planing cutter head is disposed immediately after the feed mechanism and immediately after the said planing cutter head is mounted a guide edge prejointer on the far side of the machine and a pre-edge jointer on the near side of the machine, the two being oppositely disposed.

The modified form, schematically illustrated, of my invention shown in Fig. 10 has a first face planing cutter head 130 immediately following the feeding mechanism having top rollers 131 and 132 forming the upper unit of the feed mechanism corresponding to rollers 22 and 23 forming the upper unit of the feed mechanism of Figs. 1 and 2, including construction and operation. Cutter head 130 corresponds in construction and mode of operation, including pressure bars, to cutter head 30 of Figs. 1 and 2. Edge guide 133 is similar in construction and mode of operation and location to guide 29 of Fig. 1. Immediately after face planing cutter head 130 is located guide edge prejointer 134 on the far side of the machine or stock corresponding in construction and mode of operation to guide edge prejointer 35 of Figs. 1 and 2. Opposite to guide edge prejointer 134 is disposed in this form of my invention prehogging edge cutter head 135 corresponding in construction and mode of operation to prehogging cutter head 52 of Figs. 1 and 2, including resiliently mounted pressure bar 136 and shoe guide 137.

Next is located immediately after said cutter heads 134 and 135 the back face planing cutter head 138 and finishing face planing cutter head 139 similar in construction to cutterheads 41 and 47, respectively, of Figs. 1 and 2, including construction, mode of operation, location and including their pressure bars. After finish face planing cutter head 139 are oppositely disposed matching cutter heads 140 and 141 when the stock is to be converted into flooring-cutter head 141 having resiliently mounted pressure bar 142 and shoe guide 143.

Next is provided outfeed mechanism 144 similar in construction and mode of operation to corresponding mechanism 65 in Fig. 2.

All the cutter heads, it will be understood, are adjustably mounted. This is also true of the feed mechanism and the guides (slots and bolts). For example matcher heads 57 and 58 have traverse screws 150 and 151 respectively for transverse adjustment and screws 150a and 151a for vertical adjustment. Motor 152 functions to adjust vertically cutter heads 30, 47 and plate 46 according to standard construction as shown in Patent 2,102,186 to which reference is made above. Back planing head 41 has traverse screw 153 and vertical adjusting screw means 154. Guide edge prejointer head 35 has traverse screw 155 for transverse adjustment and screw means 156 for vertical adjustment. The feed mechanism has vertical adjustment comprising motor 157 which drives screw means 158 which actuates means 28 through lever 159. In Figures 9 and 10 schematically showing modifications of my invention, it will be understood that the locating of a cutter head 135 to feed end of the machine permits the locating of the matcher heads 140 and 141 towards cutter head 139 so that compactness is gained.

Mode of operation

The mode of operation has been set forth in large part hereinabove, both in introduction and construction parts.

A piece of stock or blank 85 is fed through the rollers and directed downwardly to the first face planing cutter head 30, the pressure bars 31 and 32 holding the stock securely against the platen 33. Only that portion of the stock above a certain predetermined thickness is removed by the prehogger planer cutter head 30, i. e., a thickness measurement is given the stock. This cut is designed to remove all excess stock above a predetermined thickness of stock. If the board is of sufficient thickness, this cut will be enough to make the board smooth and particularly to remove rough saw marks with enmeshed dirt and grit and all high points in the uneven surface to provide a firm, smooth, clean guiding surface which reduces friction. The cut may vary in thickness from almost zero to one-half of an inch and sometimes considerably more. As this variation in cut may be in a relatively short length of stock, it tends to set up vibrations of a severe character. The stock then passes to the guide edge prejointer 35 which operates to smooth the edge, i. e., take a cut sufficient to remove saw marks with enmeshed dirt and grit so that the abrasion character of the surface is eliminated.

My invention takes advantage of the feed mechanism to hold this stock while it is being operated upon by the first face planing cutter head 30 and the guide edge prejointer 35. The axis of the feed mechanism is disposed at an angle to the axis of the machine and to the edge guide 29. Also there is a hold over shoe 37 which normally may cause the stock to reach the edge guide 29 or the end portion thereof before it reaches the face planing cutter head 30. However, if the stock has not reached the edge guide 29 by the time it reaches the first face planing cutter head 30 it will be acted upon by said head 30 in any event. In other words, the stock is being operated upon to give it a smooth surface even while en route diagonally of its length to the edge guide. However, the feeding of the stock is directed to the edge guide 29 in the area of the guide occupied by the guide edge prejointer 35 or against the head itself so that at least it will be edge-smoothed if it is a normal piece of stock. If it is of the character shown in Fig. 5, then the convex edge 83 will be substantially maintained against the guide edge prejointer head 35 as the edge is run somewhat in the path of a large circle and the edge thus insured to be operated upon by the guide edge prejointer 35. If the piece is run with the concave side 82 towards the guide edge prejointer located on the far side of the channel way, that is, on the side where the guide 29 is located, then at least end portions of the stock will be smooth jointed and the central convex portion may be skipped, which is the exceptional case.

Applying great pressure of the stock in feeding the same against the edge guide is carefully avoided in ordinary practice to prevent the development of friction which will set the stock on fire and cause warping of the guide by the development of great heat. However, in my invention, it goes against this idea and I have discovered that the guide edge prejointer 35 operates to reduce the danger of such undue development of heat, that is, it reduces the pressure and as respects the following guide 61 provides a smooth edge which functions to greatly reduce the normal friction—the abrasive character of the surface having been removed.

The feed mechanism 21 of the lower unit and the rolls 22 and 23 of the upper unit operate to hold the stock against the guide edge prejointer as well as while the stock is passing beneath the first face planing cutter head 30. In this wise, the stock is insured being consistently and uniformly fed and caused to run truly against the edge guides 29, 61 and 69.

Thus, the preferred location of the guide edge prejointer 35, immediately after the first face planing cutter head 30 and in this wise the holding force of the feeding mechanism is employed for both cutter heads and in holding the stock towards the guide. Also, such holding force operates to minimize the vibrations developed by both cutter heads. The first face planing cutter head is in a position to operate upon the stock even if the stock has not yet reached the guide and the guide edge prejointer 35 is in position to operate upon the stock while the stock is being flexed en route to be operated upon by the back face planing cutter head. All this functions in keeping the length of the machine to a minimum.

Next the lumber is pressed against the plate 46 by resiliently mounted pressure bars 43, 44 and 45 disposed on each side of the back face cutter head 41. Particularly be it noted that this flexing of the stock is a very gradual flexing and permits the guide edge prejointer 35 to operate while the stock is en route to the underside of the plate 46. Thus, free flowing of the stock is permitted and undue feed pressure to push the stock through the machine is not required. Guide edge prejointer 35 operating as it does upon the edge of the stock in biting into it with its knives sets up vibrations in a direction substantially 90 degrees to those developed by the first face planing cutter head 30, and therefore also contributes to dampen or blot out such vibrations. Furthermore, by running the stock immediately from the guide edge prejointer head 35 to the plate 46 provides for a dampening of the vibrations as well, due to the stock being held against a relatively extended length of said plate. The lumber being definitely flexed also operates to cancel the longitudinal vibration. The lumber is readily flexed against plate 46 by reason of the fact that its edge bearing against the edge guide 67 has a clean, uniform edge provided by the guide edge prejointer 35 and therefore does not develop great frictional forces against deflection. As the top surface of the stock has been smoothed by the first face cutter head 30, there is a smooth firm face of the lumber bearing against the top plate 46 which thus likewise has a minimum of frictional resistance and a true thickness measurement is given the stock. Thus there is a definite cooperation between the operation of the cylinder 30 and the guide edge prejointer head 35 with the back planing cutter head 41 in reducing friction and in overcoming vibrations set up by such members together with the top plate 46 against which the stock is flexed as well as the form of the flexed lumber itself— all of which cooperate in providing for a free flowing of the lumber in the passageway of such enlarged dimension as to permit such flexing. The back planing cutter head 41 normally removes a cut in the stock, but whenever the stock lacks sufficient thickness then such cut is not taken—it being a matter of lessened importance that the bottom of the stock is not planed. The stock upon leaving the cutter head 41 is flexed as it reaches the finish face planing cutter head 47. Pressure bars 49 and 50 hold the stock against the bed 87 which may extend from a point adjacent the cutter head 41 to the front of the machine, past the matchers 57 and 58. As the stock leaves the finishing cutter head 47 it is preferably maintained against guide 61 by means of the push over shoe 51. The edge jointer or prehogger 52 removes all of the surplus stock from the near side of the stock (i. e., the side opposite guide 61), to a predetermined width. This may amount to a considerable cut up to as much as half an inch or one inch of stock as this head largely functions to determine the width of the stock. The stock is sawed with extra width due to much of the stock having a wane so allowance must be made therefor. Rough sawing is usually done at rapid rates of feed in the mill with care taken not to go below a size. Due to inaccuracies of size at high rates of speed the stock is sawn oversize, the fundamental requirement of the operator being to secure the largest dimensioned cants out of a given piece of lumber possible. Logs are usually sawn to fill certain orders calling for certain sizes of stock as eight inches by eight inches or twelve inches by twelve inches in cross-section, and after such special orders are cut out of the logs the balance, i. e., cants, is worked up into standard sizes of lumber of a narrower width. Frequently such stock contains much excess width. It is from these pieces of varying width of stock that flooring is ordinarily made.

The stock next passes to the oppositely disposed matcher heads 57 and 58 which provide the tongue and groove respectively. A particularly accurate cutting is provided by the fact that there is very little of the width of the stock to be removed by them so that the knives may take a very reduced cut in this finishing operation and they may operate for prolonged periods without sharpening due to their operating on clean edges and a cut relatively thin. It is essential that these matching heads be oppositely disposed in order that the tongue and groove may be simultaneously provided in the stock to secure precision results. This is especially true in distorted blanks of stock, as a curved piece, such as is shown in Fig. 5. Finally the stock is then engaged by the out feed rollers 64 and 65 which function primarily to discharge the last blank when the machine is to be stopped.

The providing of an open channel so that the stock may be flexed ("upwardly" and "downwardly" if the machine is positioned as illustrated—it being understood that this is only the preferred position) as opposed to any restricted channel or choked channel to be the primary confining means of the stock, avoids the necessity of high feed pressures on the stock to force it through the passageway and past the various cutters, pointers and matchers. By providing for the flexing of the stock at right angles to its face and providing for this to be done one "downwardly" at the feed mechanism and as it passes beneath cutter head 30 and one "upwardly" as it passes the back planing cutter head 42 and again "downwardly" as it passes cutter head 47, my invention provides for imparting the form to the flexed stock that operates to dampen and blot out the vibrations developed in the stock by reason of the cutter heads 30 and 35 in the form shown in Figs. 1 and 2. By giving the stock a smooth face surface by the first face planing cutter head 30 and by giving the stock a smooth edge by guide edge prejointer 35, the frictional forces developed as the top surface and the side edge press against the plate 46 and the edge guide 61, respectively, permits the stock to be flexed readily up and down and move forward with minimum friction and thereby avoids the development of high feed pressures. The free flowing of the stock and its flowing truly and uniformly with a minimum friction provides for minimum feed pressure which thereby avoids compressing the fibrous mass forming the stock and avoids compressing the hard parts of the growth circles into the soft parts so that raised grain defects are avoided and the knives in compressing the hard portions of the growth circles are not working upon an already compressed material, and therefore are free to do their cutting operation to provide a smooth face and not tear the cross grain of the product and leave a coarsely, roughened surface to develop after the cutting.

The location of the guide edge prejointer 35 between the first face planing cutter head 30 and the back planing cutter head 41 is advantageous in providing the improved product as it cooperates in blanketing vibrations particularly arising from the first face planing cutter head 30 whose cut from the stock varies greatly in thickness and therefore is particularly the cause of imparting vibrations to the stock, especially when the stock is being passed at the high rate of 500 to 700 lineal feet per minute.

Important as these features are, nevertheless the providing of a guide edge prejointer and the locating of this edge jointer 35, as in my invention, directly after the first face planing cutter head 30, has achieved a result for improved product which we have not been able to obtain heretofore. Heretofore great difficulty in feeding the stock and causing it to be carried uniformly, as respects the different character of pieces or blanks of stock, against the edge guide to be sure that the guide or groove edge jointer takes its proper cut. By arranging the guide edge prejointer on the far side of the machine, and as set forth in my invention, the said pre-jointing operation is performed upon the stock after a portion of the thickness of the stock has been removed by the first face planing cutter head 30, and the amount of power required may be reduced by as much as twenty-five percent as a portion of the thickness of the stock has been removed from the normal blank of stock.

Moreover, the location of this prejointer head, as in my invention, after the first face planing cutter head 30, permits the latter cutter head to perform its operation even though the stock is still en route transversely of the machine to the edge guide.

By so locating the guide edge prejointer, as in my invention, experience has proven that a finished jointed edge is more positively insured. As a result the product is provided with a true corner on the face on the side of the stock having the groove. This is most important because if the stock lacks a finishing operation on this corner of the stock, then a crack at 86 (Fig. 7) will be formed between the flooring boards when assembled. By removing the rough portions on the edge by the jointer 35, the stock is not only made to run true and free flowing, but it allows the matcher head 57 to remove a small cut which it may do accurately and precisely and without the knives becoming dulled by having the work of removing a considerable depth of cut.

Since, as explained hereinabove, the rule is to run the stock with the edge of the stock to receive the groove against the edge guide of the machine taking a fixed cut, the fact that the stock is running true to the edge guide in my invention due to the operation of the guide edge prejointer 35 and that the stock is considerably initially fed against the guide, the matcher head 58 providing the groove need only be set for a relatively light cut and thereby a constant saving of stock results.

With the form of my invention set forth in Fig. 8 wherein the first planing cutter head is omitted, the guide edge prejointer 90 located in cooperating position with the feeding mechanism unit formed by rolls 91 and 92 and the unit formed by rolls 93 and 94, the mode of operation is practically the same as set forth for guide edge prejointer 35. The important function of providing a smooth guiding edge combined with causing the stock to run truly against the edge guide is provided or retained in this form even though the first face planing head is omitted.

In the modified form of my invention set forth in Fig. 9, the prehogger 118 is moved to the front end of the machine i.e., the feed end, and positioned after the first face planing head 115, which in turn is placed in this form after the guide edge prejointer 110. Preferably the guide edge prejointer 110 would be placed after the first face planing cutter head 115 because then the latter may operate upon the stock even while the same is en route to the edge guide 114, and so greater compactness results. Locating the edge prehogger 117 as in this form has the advantage among others of removing the cause of vibrations away from the matching heads when flooring is being run. Since the matching heads do a finishing operation, their operation is more secure from vibrations. The guide edge prejointer 110 performs its valuable function in cooperation with the feed mechanism. However, even when its location is moved further back from the feeding mechanism so that the holding function of the feeding mechanism is sacrificed, still it would have the advantage set to take a relatively thin fixed cut and thereby save stock.

In the modified form of Fig. 10 of my invention, the guide edge prejointer 134 and the edge prehogger 135 are oppositely disposed and located after the first face planing cutter head 130 so that here the feed mechanism also functions for all three of the cutter heads in holding the stock. The hold over shoe 113 of Fig. 9 may be omitted in this form and the chip breaker or pressure bar 136 made to perform the push over function. Here, also, the vibrations of the heavier cuts are maintained remote from those cutter heads doing the finishing operations. The matcher 140 may be set to take its relatively light cut provided for by my invention with the consequent saving of stock.

Obviously changes may be made in the forms, dimensions and arrangement of the parts of my invention, without departing from the principle thereof, the above setting forth only preferred forms of embodiment.

I claim:

1. In a planer mechanism a planer frame, a stock feed means mounted on said frame; a first face planing cutter head disposed in close proximity to said feed mechanism; a resiliently mounted pressure bar located adjacent and before said head; a plate oppositely disposed to said planing cutter head against which the stock may be downwardly flexed thereby providing free flowing of stock; guide edge prejointer disposed directly after said first face planing cutter head; a stock hold over means oppositely disposed to said guide edge prejointer; a back face planing cutter head disposed directly after said guide edge prejointer; resiliently mounted push bars adjacent forwardly and rearwardly of said back face planing cutter head; and an adjustable plate above said back cylinder head whereby the stock may be flexed against the same.

2. The method of processing lumber comprising feeding the stock at an angle to the longitudinal axis of the machine inclining from the in-feed end to the near side in direction of feed; simultaneously flexing and treating the stock by planing to provide a thicknessing cut of the stock and to provide a smooth face; pre-jointing one edge of the stock following said first face planing; flexing and treating the stock by planing the back face of the stock to provide a smooth back and thicknessing operation to the stock; flexing the stock immediately after the planing of said back face and treating the stock by planing to provide the stock with a finished face and thicknessing; and pre-jointing the stock on the other edge.

3. The method of processing lumber stock at high speed in a planer from rough sawed non-uniform dimensional blanks in providing a tongue and groove product comprising the steps of simultaneously guide edge pre-jointing in providing a smoothing cut to the groove side of the stock and feeding the stock blanks in a diagonally disposed path in end to end relation thereby dampening vibrations; subjecting the stock to a first smoothing face planing while said stock is flexed normal to its face under stock metering pressure as to thickness, thereby providing free flowing of the stock and isolation of the prejointing vibrations, and subjecting said stock to matching cutter operation.

4. The method of processing lumber stock at high speed in a planer from rough sawed non-uniform dimensional blanks in providing a tongue and groove product comprising the steps of simultaneously guide edge pre-jointing in providing a smoothing cut to the groove side of the stock and feeding the stock blanks at the rate of 500 to 700 feet per minute in a diagonally disposed path in end to end relation thereby dampening vibrations; subjecting the stock to a first smoothing face planing while said stock is flexed normal to its face under stock metering pressure as to thickness, and while being prejointed thereby providing free flowing of the stock and isolation of the prejointing vibrations, and subjecting said stock to matching cutter operation.

5. The method of processing lumber stock at high speed in a planer from rough sawed non-uniform dimensional blanks in providing a tongue and groove product comprising the steps of simultaneously guide edge pre-jointing in providing a smoothing cut to the groove side of the stock and feeding the stock blank in a diagonally disposed path in end to end relation thereby dampening vibrations; subjecting the stock to a top face smoothing planing while said stock is flexed normal to its face under stock metering pressure as to thickness, thereby providing free flowing of the stock and isolation of the prejointing vibrations, and subjecting said stock to matching cutter operation.

6. In a planer mechanism, a planer frame having in-feed and out-feed ends longitudinally considered and near and far sides of said frame transversely considered; an edge guide mounted on said frame and inclined transversely of said frame from the in-feed end of said frame towards the near side in the direction of feed and extending from end to end of the device; a stock passageway bounded on one side by said edge guide; jointer cutter heads mounted on said frame at the out-feed end of said frame on opposite sides of said stock passageway the cutter head on the edge guide side of the stock being adjusted to take a relatively thin fixed cut and thereby saving great quantities of stock daily; a guide edge prejointer cutter head mounted adjacent said edge guide in providing a grit free and smooth guiding edge for the stock in reducing the pressure required for feeding and in preventing raised grain and burning of the stock by reason of friction and to make the stock run true-to-the-edge guide throughout the length of the edge guide; a stock feeding mechanism at the in-feed end of said frame having a tread bed and feed registering spaced rollers thereabove for feeding the stock and at the same time for holding the stock in being directed to the area of said edge guide occupied by said prejointer cutter head, in providing for said stock feeding mechanism to absorb part of the vibration set up by said guide edge pre-jointer and the said feeding mechanism caused to operate also as a holding means for the stock against the said guide edge pre-jointer.

7. In a planer mechanism, a planer frame having in-feed and out-feed ends; groove and tongue matching heads mounted on said frame at the out-feed end of said frame; an edge guide mounted on the groove matcher head side of said frame and inclined transversely of said frame from the in-feed end of said frame towards the side in the direction of feed on which the tongue matcher head is located and extending from infeed to outfeed end; a stock feeding mechanism at the in-feed end portion of said frame having a tread bed and feed registering spaced rollers thereabove whereby stock may be moved therebetween and at the same time held against lateral displacement; and a guide edge prejointer cutter head on the edge of the frame on which is located the groove cutting matcher head and disposed as respects said groove cutting matcher head towards the in-feed end of said frame in providing a grit free and smooth guiding edge for the stock in reducing the pressure required for feeding and in preventing raised grain and burning of the stock by reason of friction and to make the stock run true-to-the-edge guide throughout the length of the edge guide.

8. A planer mechanism comprising a frame having in-feed and out-feed ends longitudinally considered and near and far sides transversely considered; a stock passageway disposed longitudinally of said frame; jointer cutter heads mounted one on each side of said passageway; an edge guide mounted on said frame forming a boundary of said passageway extending substantially from end to end of said frame and inclined in the direction of feed continuously throughout its length transversely of said frame towards the near side; a top face finishing cutter head in the outfeed end portions; a bottom face finishing cutter head in the outfeed end portions; a stock feeding mechanism angularly mounted on said frame with respect to the edge guide and adjacent to said passageway on the in-feed end of said frame; said mechanism inclining towards said guide in direction of feed in forcing said stock at the feeding end against said guide in thereby facilitating and maintaining contacting relationship between said edge guide and maintaining said stock running true-to-the-guide throughout the length of the guide; a guide edge prejointer cutter head mounted adjacent the edge guide on the far side between said face cutter heads and said feeding mechanism in providing a grit free and smooth edge face to bear against the edge guide in its preparation for said jointer cutter heads at the outfeed end and said top face and bottom face cutters operating while said stock is running true to the edge guide; a first top face cutter head mounted between said feeding mechanism and said guide edge prejointer cutter head in providing a smooth guiding face in reducing the feeding pressure in forcing said stock past said top and bottom face finishing cutter heads and reducing the power requirement for actuating said guide edge pre-jointer; a pre-edge hogging jointer mounted on that side of the stock passageway opposite the side on which said guide edge jointer is located and between said jointer cutter head on the out-feed end and said feeding mechanism in reducing the width of the stock in providing for only a thin cut to be made by said jointer cutter at the outfeed end on the far side of the stock while said stock is running true-to-the-guide.

9. A planer mechanism comprising a planer mounting mechanism having infeed and outfeed ends longitudinally considered and far and near sides transversely considered; groove and tongue matching heads, said heads disposed adjacent the outfeed end portion, one being located on the near side and the other on the far side engageable with stock being fed therepast of varying dimensions to be formed into lumber products; an edge guide mounted on that side of said mounting means on which the groove matcher head is located, said guide extending with gaps for mechanism from infeed end to outfeed end portion and inclined in direction of feed transversely of said mounting means from the infeed end towards said side on which the tongue matcher head is located in providing continuous guiding contact for the stock; a stock feeding mechanism at the infeed end portion which mechanism has its longitudinal axis inclined towards said edge guide in the direction of feed in forcing said stock at the very commencement of its passage at the said feed end against said edge guide in thereby facilitating and maintaining said contacting relationship between said edge guide and said stock throughout the length of the guide; and a guide edge pre-jointer cutter head disposed in longitudinal alignment with and ahead of the groove cutting matcher head engaging the edge of the stock in providing a grit free and smooth edge face substantially end to end of the stock to bear against the guide in its preparation for said groove matcher head to remove a relatively thin fixed cut therefrom as compared to ordinary practice and in providing for said stock to run with minimum friction true-to-the-edge guide, which true running, is also supplementally caused by the inclination of said edge guide and the said inclination of the feeding mechanism to said edge guide.

10. A planer mechanism comprising a planer mounting mechanism having infeed and outfeed ends longitudinally considered and far and near sides transversely considered; groove and tongue matching heads, disposed at the outfeed end portion, one being located on the near side and the other on far side engageable with stock being fed therepast of varying dimensions to be formed into lumber products; an edge guide mounted on that side of said mounting means on which the groove matcher head is located, said guide extending with a gap therein for the reception of cutter head mechanism from infeed end portion to said outfeed end portion, inclined in the direction of feed transversely of said mounting means from the infeed end towards said side on which the tongue matcher head is located; a guide edge pre-jointer cutter head disposed in longitudinal alignment with the groove cutting matcher head in said gap, engaging the edge of the stock near the infeed end of said guide in providing a grit free and smooth edge face substantially end to end of the stock to bear against the edge guide in its preparation for said groove matcher head to remove a relatively thin fixed cut therefrom as compared to ordinary practice and in providing for said stock to run with minimum friction true-to-the-edge guide; and a stock feeding mechanism in the infeed end portion of said mounting mechanism, said feeding mechanism having its longitudinal axis inclined in the directon of feed towards the area of the edge guide occupied by said guide edge pre-jointer forcing said stock at the feeding end against said edge guide in thereby facilitating and maintaining contacting relationship between said edge guide and said stock throughout the length of the guide, said stock being caused to run with maximum pressure against the area of said guide occupied by said guide edge pre-jointer cutter head and thereby causing the friction against the guide to be reduced by said edge pre-jointer assuming part of the thrust.

11. A planer mechanism comprising a frame having infeed and outfeed ends longitudinally considered and near and far sides of said frame tranversely considered; an edge guide which is mounted on said frame, said guide being inclined in the direction of feed transversely of said frame from the infeed end of said frame towards the side of the passageway oposite to that on which it is located, said guide extending with a gap for cutter feed mechanism from the infeed end portion to said outfeed end portion; a guide edge pre-jointer cutter head disposed adjacent said edge guide and extending in said gap in engaging that side of the stock next to said guide in providing a grit free and smooth edge face substantially end to end of the stock to bear against the guide to enable said stock to run with minimum friction true-to-the-edge guide which trueness of running is also supplementally caused by the inclination of said edge guide; an edge pre-hogger cutter head located on that side of the passageway opposite to that on which said guide is located in the outfeed end portion; and stock push over bars disposed in front and rear of said edge pre-hogger cutter head in causing said cutter head to take a cut which reduces the width of the stock to a predetermined magnitude while running with its smooth face true to said guide.

12. A planer mechanism comprising a planer mounting structure forming a rigid base having infeed and outfeed ends longitudinally considered and a near and far side to the structure transversely considered; an edge guide mounted on said mounting structure which guide is inclined longitudinally in the direction of feed from infeed end of the far side towards the near side at the outfeed end, the said edge guide extending from said infeed to the outfeed end with gaps for cutter head mechanism to operate therethrough; a stock feeding mechanism the longitudinal axis of which is inclined towards the edge guide in direction of feed, in forcing said stock at the feed end against said feed guide in facilitating and maintaining said contacting relation of the stock between said edge guide and said stock substantially throughout the length of the edge guide; a guide edge pre-jointer extending through one gap of said edge guide and disposed ahead of said feeding mechanism in providing a grit free and smooth edge face to the stock substantially end to end to bear against the guide in its preparation for the groove matcher head to take a relatively thin fixed cut and in providing for said stock to run with minimum friction and true-to-the-edge guide which true running is also supplementally caused by the said inclination of said edge guide and the said inclination of the feed mechanism to said edge guide; stock press over means opposite said guide edge pre-jointer cooperating with the edge guide in limiting the cut of the guide edge pre-jointer to a predetermined magnitude; a groove matcher head in the outfeed end portion of the mechanism operating through a gap in said edge guide; a tongue matcher head on the near side in the outfeed end of the mechanism, said heads operating on the stock simultaneously with one edge of the stock bearing against one and the same edge of said edge guide throughout the passing of the stock; a stock pressure means for said tongue matcher head in front of said tongue matcher; an edge pre-hogger head mounted adjacent and ahead of said tongue matcher head which pre-hogger removes from the stock all but a small portion of the width leaving only a thin cut to be removed to reduce the width to the exact width of the product for said groove and tongue matcher heads; resilient stock press over means bearing against the edge of the stock and disposed in front of said edge pre-hogger in providing a measured width for the stock; a top face finishing cutter head in front of said stock edge press over means; a guide plate opposite said face cutter head; resilient stock press down means in front and rear of said face cutter head flexing the lumber down against said bed plate in providing a measured thickness for the stock; a back cutter head disposed ahead of said face cutter head; a bed plate oppositely disposed to said back planer cutter head; stock press up means in front of and in the rear of said back cutter head flexing said stock against said oppositely disposed bed plate in determining the magnitude of cut to be taken by said back cutter head, which flexing of the stock eliminates the transmitting of vibration of the guide edge pre-jointer; and a passageway extending from the infeed end to the outfeed end of said structure formed by said cutter heads, edge guide, and stock pressing means being located with respect to each other in such spaced relation in providing a space for said stock to be flexed up and down in passing from one of said face and back planer cutters to another, said flexing being simultaneously on different parts of the stock longitudinally considered which lessens the transmitting of vibrations longitudinally of the stock, and the stock is caused to flow through said passageway at a high rate of speed by reason of the edge being pre-jointed to present a smooth grit free edge running true-to-the-edge guide while said stock is being precisely processed with non grain raising feeding pressure.

13. A planer mechanism comprising a planer mounting structure forming a rigid base having infeed and outfeed ends longitudinally considered and a near and far side to the structure transversely considered; an edge guide mounted on said mounting structure which guide is inclined longitudinally in the direction of feed from infeed end of the far side towards the near side at the outfeed end, the said edge guide extending from said infeed to the outfeed end with gaps for cutter head mechanism to operate therethrough; a stock feeding mechanism the longitudinal axis of which is inclined towards the edge guide in direction of feed, in forcing said stock at the feed end against said feed guide in facilitating and maintaining said contacting relation of the stock between said edge guide and said stock substantially throughout the length of the edge guide; a guide edge-pre-jointer extending through one said gap of said edge guide and disposed ahead of said feeding mechanism in providing a grit free and smooth edge face to the stock substantially end to end to bear against the guide in its preparation for the groove matcher head to take a relatively thin fixed cut and in providing for said stock to run with minimum friction and true-to-the-edge guide which true running is also supplementally caused by the said inclination of said edge guide and the said inclination of the feed mechanism to said edge guide; stock press over means opposite said guide edge pre-jointer cooperating with the edge guide in limiting the cut of the guide edge pre-jointer to a predetermined magnitude; a first face planer cutter head in front of said edge pre-jointer; a bed plate opposite said first face planer cutter head; stock pressing over means adjacent said first face cutter head in determining the magnitude of cut to be taken by said face planer cutter head; a groove matcher head in the outfeed end portion of the mechanism operating through a gap in said edge guide; a tongue matcher head on the near side in the outfeed end of the mechanism, said heads operating on the stock simultaneously with one edge of the stock bearing against one and the same edge of said edge guide throughout the passing of the stock; a stock pressure means for said tongue matcher head in front of said tongue matcher; an edge pre-hogger head mounted adjacent and ahead of said tongue matcher head which pre-hogger removes from the stock all but a small portion of the width leaving only a thin cut to be removed to reduce the width to the exact width of the product for said groove and tongue matcher heads;

resilient stock press over means bearing against the edge of the stock and disposed in front of said edge pre-hogger in providing a measured width for the stock; a top face finishing cutter head in front of said stock edge press over means; a guide plate opposite said face cutter head; resilient stock press down means in front and rear of said face cutter head flexing the lumber down against said bed plate in providing a measured thickness for the stock; a back cutter head disposed ahead of said face cutter head; a bed plate oppositely disposed to said back planer cutter head; stock press up means in front of and in the rear of said back cutter head flexing said stock against said oppositely disposed bed plate in determining the magnitude of cut to be taken by said back cutter head, which flexing of the stock eliminates the transmitting of vibration of the guide edge pre-jointer; and a passageway extending from the infeed end to the outfeed end of said structure formed by said cutter heads, edge guide, and stock pressing means being located with respect to each other in such spaced relation in providing a space for said stock to be flexed up and down in passing from one of said face and back planer cutters to another, said flexing being simultaneously on different parts of the stock longitudinally considered which lessens the transmitting of vibrations longitudinally of the stock, and the stock is caused to flow through said passageway at a high rate of speed by reason of the top surface being plane and by reason of the edge being pre-jointed to present a smooth grit free top and edge guiding surface running true-to-the-edge guide while said stock is being precisely processed with non grain raising feeding pressure.

14. The combination of claim 9; and a first face planing cutter head mounted adjacent said guide edge pre-jointer in providing for the edge pre-jointing to be done while the stock is being flexed in passing to the guide in providing for compactness of structure, and for lessening the power required for operating the guide edge pre-jointer.

15. The combination of claim 9; and a first face planing cutter head mounted next after said feeding mechanism in providing for the stock to be firmly held thereby and the vibrations developed in the stock by said face planing cutter head lessened by said holding in reducing the thickness of the stock and the power employed by said guide edge pre-jointer in its operation.

16. In a planer mechanism a planer mounting mechanism having infeed and outfeed ends and near and far sides of the mechanism for the passing of stock to be processed; an edge guide mounted on one side of said mounting means, having a gap, and extending from infeed to outfeed end and inclined transversely of said mounting means into the path of the stock in cooperatively causing the stock to run true to the said guide; a guide edge pre-jointer cutter head operating through said gap in said guide in making a limited cut on the stock in providing a grit free and smooth guiding edge for the stock in reducing the pressure required for feeding in preventing raised grain and non-burning of the stock by reason of friction; a stock feeding mechanism feeding the stock from infeed to outfeed end and having its longitudinal axis inclined to the portion of said edge guide occupied by said guide edge pre-jointer cutter head in facilitating the stock to run true to the said guide edge and causing the said edge guide pre-jointer cutter head to assume part of the thrust of said stock against said edge guide; a first face planing cutter head disposed next after said feed mechanism in providing a smooth top guiding face for said stock and reducing the power required in the operation of said guide edge pre-jointer cutter head; and an adjustable bed plate oppositely disposed to said face planing cutter head against which the stock may be flexed.

17. In a planer mechanism the combination of a mounting means having infeed and outfeed ends for the passing of stock to be processed; an edge guide mounted on said mounting means extending from infeed to outfeed end and inclined in one direction from end to end transversely of said mounting means into the path of the stock; a guide edge pre-jointer cutter head disposed adjacent said guide and operating through said guide in making a limited cut on the stock in providing a grit free and smooth guiding edge for the stock in reducing the pressure required for feeding and in preventing raised grain and burning of the stock by reason of friction and making the stock run true-to-the-guide throughout the length of the edge guide; a channel extending along said guide permitting flexing and free flowing of the stock; and a stock feeding mechanism mounted on said mounting means in close proximity to the guide edge prejointer cutter head having its longitudinal axis inclined to said guide and firmly directing the feeding of the stock to the portion of said edge guide occupied by said guide edge prejointer cutter head in forcing said stock at the feed end against said edge guide in facilitating and maintaining said contacting relation of the stock with said edge guide throughout the length of the latter and causing said edge guide pre-jointer cutter head to assume part of the thrust of said stock against said edge guide.

18. In a planer mechanism a frame having an infeed and an outfeed end for passing of compressible stock of varying form and moisture content to be processed; an edge guide on one side of said frame extending from infeed to outfeed end of said frame and having a gap therein; a guide edge pre-jointer cutter head extending through said gap of said guide in making a limited cut on the stock in providing a grit free and smooth guiding edge for the stock in reducing the pressure required for feeding and in preventing raised grain and burning of the stock by reason of friction and making the stock run true-to-the-guide throughout the length of the edge guide; a stock feeding mechanism feeding the stock from infeed to outfeed ends of said mechanism and having its longitudinal axis inclined towards said guide and firmly directing the feeding of the stock to the portion of said edge guide occupied by said guide edge pre-jointer cutter head in forcing said stock at the feed end against said edge guide in facilitating and maintaining said contacting relation of the stock between said edge guide and said stock substantially throughout the length of the edge guide; and a pair of jointing cutter heads at the outfeed end engaging opposite sides of the stock, the jointer head on the edge guide side extending through said guide and being set to take a relatively thin fixed cut in avoiding wastage due to guide edge pre-jointer preparation of said edge of the stock and its causing both the jointer heads to operate with accuracy due to the stock running true-to-the-guide in said contacting relationship.

19. In a planer mechanism comprising a planer mounting structure having infeed and outfeed ends longitudinally considered and near and far sides to the structure transversely considered for passing compressible stock of varying form and moisture content; an edge guide mounted on said mounting structure which guide is inclined longitudinally in the direction of feed from infeed end of the far side towards the near side at the outfeed, the said edge guide extending from said infeed end to the outfeed with gaps for mechanism to operate therethrough; a stock feeding mechanism, the longitudinal axis of which is inclined towards the edge guide in direction of feed in forcing said stock at the feed end against said guide in facilitating and maintaining said contacting relation of the stock between said edge guide and said stock substantially throughout the length of the edge guide; a guide edge pre-jointer cutter head extending through a gap in said edge guide in the feed end portion of the mounting structure in engaging the stock while being flexed in providing a grit free and smooth edge face to the stock substantially end to end to bear against the guide in its preparation for the removal of a relatively thin fixed cut at the outfeed end and in providing for said stock to run with minimum friction and true-to-the-edge guide throughout the length of said guide thereby reducing the pressure of the feeding mechanism in maintaining the stock in continuous ribbon-like form at high speed travel and in avoiding raised grain in the delicate compressible stock; a pair of jointing cutter heads at the outfeed end engaging opposite sides of the stock, the jointer head on the edge guide side extending through a gap in said guide and being set to take a relatively thin fixed cut in avoiding wastage due to guide edge pre-jointer preparation of said edge of the stock and said pre-jointer causing both the jointer heads to operate with accuracy due to the stock running true-to-the-guide; a top face finishing cutter head in front of said pair of jointer heads; a guide plate opposite said face cutter head; resilient stock press down means in front and rear of said face finishing cutter head flexing the stock down against said bed in providing measured thickness for the stock; a back cutter head disposed ahead of said face cutter head; a bed plate oppositely disposed to said back planer cutter head; and stock press up means in front of and in the rear of said back cutter head flexing said stock against said oppositely disposed bed plate in determining the magnitude of cut to be taken by said back cutter head; the flexing of the stock by said stock press down and up means against said bed plates operating to eliminate the transmitting of vibrations in the stock due to the operation of cutter heads and high speed travel of the stock thereby providing a free flowing of the stock to the pair of jointer heads and face finishing cutter head, the guide edge pre-jointer operating on said edge aiding said free flowing and operating while said stock is being flexed into position above said back planer cutter head thereby providing compactness longitudinally of the machine.

20. A planer mechanism comprising a frame having infeed and outfeed ends longitudinally considered; a stock passageway extending longitudinally of said frame from infeed to outfeed ends on one side of said frame for the passing of compressible and varying forms of stock in end to end relation; a groove and tongue matching heads, one being on one side and the other on the other side of said passageway, said groove matcher head being set to take a relatively thin fixed cut in saving stock by reason of the preparation of the stock by previous mechanism mounted in line on the frame; an edge guide mounted laterally of said feeding mechanism and extending from end to end of the machine and on the side of the passageway on which the groove matching head is located through which guide said matching head operates; a stock feeding mechanism feeding the stock from infeed to outfeed ends of said mechanism in providing end to end contact of the stock pieces and having its longitudinal axis inclined towards said guide; a guide edge pre-jointer cutter head disposed in longitudinal alignment with said grooving cutting matcher head in preparing the edge of the stock for said groove cutting matcher head by providing a thin, smoothing and grit free edge to the stock in making the stock run true-to-the-edge; a stock feeding mechanism feeding the stock from infeed to outfeed ends of said mechanism and having its longitudinal axis inclined towards said guide and firmly directing the feeding of the stock to the portion of said edge guide occupied by said guide edge pre-jointer cutter head in forcing said stock at the feed end against said feed guide in facilitating and maintaining said contacting relation of the stock between said edge guide and said stock substantially throughout the length of the edge guide; a first top face cutter head mounted after said stock feeding mechanism in providing a smoothing and limited top face cut to the stock in providing for reducing vibrations and feeding pressure and reducing the power required for operating said pre-edge jointer; resiliently mounted pressure bars in line of travel of stock and adjacent to said first top face cutter head; an adjustable platen operatively disposed below said face cutter head against which platen the stock in passing may be flexed; a stock hold over shoe opposite to said guide edge pre-jointer; a bottom cutter head in line of passageway located after said pre-edge jointer; resiliently mounted pressure bars in line of said passageway on each side of and adjacent said bottom cutter head; a fixed plate above said bottom cutter head against which the stock may be flexed upward by said pressure bars in eliminating transmitting vibrations while the stock is running true to the edge guide; a top finishing cutter head in line of said passageway; resiliently mounted pressure bars in line of said passageway on each side of and adjacent to said top finishing cutter head in providing a top face to the stock while running true-to-the-edge guide; a plate beneath said finishing cutter head against which the stock may be flexed downwardly by said pressure bars in eliminating the transmitting of vibrations; a pre-edge hogger jointer disposed in longitudinal alignment with said tongue cutting matcher head in providing the approximate width of the stock while running true-to-the-guide, said trueness of running providing for the fixed setting of the said groove matcher head to take a much thinner cut than has been the practice heretofore thereby causing a great saving of natural resource; and a stock hold over shoe mounted adjacent to said pre-edge jointer in coacting with said pre-edge hogging jointer in providing the approximate width of the stock when processing thereof is completed.

21. In a planer mechanism a stock feed means; a stock passageway of greater dimension transversely considered than the thickness of the stock in providing space for the stock to be flexed in said passageway; a first face planing cutter head disposed immediately after said feed mechanism; an adjustable bed plate oppositely disposed to said face planing cutter head; a resiliently mounted pressure bar located adjacent and before said head flexingly pressing the stock against said adjustable bed plate; a guide edge pre-jointer disposed adjacently after said first face planing cutter head, operating in a portion of said passageway in making a limited cut on the stock in providing a grit free and smooth guiding edge for the stock in reducing the pressure required for feeding in preventing raised grain and non-burning of the stock by reason of friction; a back planing cutter head disposed immediately after said guide edge pre-jointer; a fixed and adjustable mounted plate above said back planing cutter head; a resiliently mounted pressure bar located adjacent and before said back planing cutter head in causing the stock to be flexed against said adjustably mounted plate; a finish face planing cutter head mounted after said back planing cutter head; a fixed and adjustable bed plate mounted opposite said finish face planing cutter head; a resiliently mounted pressure bar located adjacent and before said finish face planing cutter head in flexingly pressing the stock against said adjustable bed plate opposite said finish face planing cutter head; oppositely disposed matcher heads disposed after said finish face planing cutter head; and an edge guide extending from end to end of the machine and forming one boundary of said passageway and inclined to the longitudinal axis of the machine from the end in which the feeding mechanism is located and from the side of the machine on which the guide edge pre-jointer is located.

22. In a planer mechanism the combination of a mounting means having in-feed and out-feed ends for the passing of stock to be processed; an edge guide mounted on said mounting means extending from in-feed to out-feed end and inclined in one direction from end to end transversely of said mounting means into the path of the stock; a guide edge prejointer cutter head disposed adjacent said guide and operating through said guide in making a limited cut on the stock in providing a grit free and smooth guiding edge for the stock in reducing the pressure required for feeding and in preventing raised grain and burning of the stock by reason of friction and making the stock run true-to-the-guide throughout the length of the edge guide; a channel extending along said guide permitting flexing and free flowing of the stock; and a stock feeding mechanism at the in-feed end portion of said mounting means in close proximity to the edge guide pre-jointer cutter head having a tread bed and feed registering spaced rollers thereabove, said stock feeding mechanism having its longitudinal axis inclined to said guide and firmly directing the feeding of the stock to the portion of said edge guide occupied by said guide edge pre-jointer cutter head in forcing said stock at the feed end against said edge guide in facilitating and maintaining said contacting relation of the stock with said edge guide throughout the length of the latter and causing said edge guide prejointer cutter head to assume part of the thrust of said stock against said edge guide.

23. In a planer mechanism the combination of a mounting means having in-feed and out-feed ends for the passing of stock to be processed; an edge guide mounted on said mounting means extending from in-feed to out-feed end and inclined in one direction from end to end transversely of said mounting means into the path of the stock; a guide edge pre-jointer cutter head disposed adjacent said guide and operating through said guide in making a limited cut on the stock in providing a grit free and smooth guiding edge for the stock in reducing the pressure required for feeding and in preventing raised grain and burning of the stock by reason of friction and making the stock run true-to-the-guide throughout the length of the edge guide; a channel extending along said guide permitting flexing and free flowing of the stock; and a stock feeding mechanism mounted on said mounting means in close proximity to the edge guide pre-jointer cutter head having an upper fixed feed unit contacting the upper side of the stock and a resilient bed portion contacting the bottom side of the stock in feeding the stock upwardly to the guide edge pre-jointer, said feeding mechanism having its longitudinal axis inclined to said guide and firmly directing the feeding of the stock to the portion of said edge guide occupied by said guide edge pre-jointer cutter head in forcing said stock at the feed end against said edge guide in facilitating and maintaining said contacting relation of the stock with said edge guide throughout the length of the latter and causing said edge guide pre-jointer cutter head to assume part of the thrust of said stock against said edge guide.

References Cited in the file of this patent

UNITED STATES PATENTS

| | | |
|---|---|---|
| 515,313 | Blaisdell | Feb. 20, 1894 |
| 556,091 | Eddy | Mar. 10, 1896 |
| 673,128 | Meyer | Apr. 30, 1901 |
| 706,130 | Thomas | Aug. 5, 1902 |
| 1,090,236 | Ross | Mar. 17, 1914 |
| 1,158,949 | McNeill | Nov. 2, 1915 |
| 2,033,804 | Angremy | Mar. 10, 1936 |
| 2,102,186 | Nicholson et al. | Dec. 14, 1937 |
| 2,204,439 | Nicholson et al. | June 11, 1940 |
| 2,269,816 | Gustin | Jan. 13, 1942 |
| 2,273,653 | Melby | Feb. 17, 1942 |
| 2,276,240 | Nicholson et al. | Mar. 10, 1942 |
| 2,309,417 | Sapp | Jan. 26, 1943 |
| 2,312,439 | Peterson | Mar. 2, 1943 |

FOREIGN PATENTS

| | | |
|---|---|---|
| 532,577 | Germany | Aug. 31, 1931 |